Figure 1:
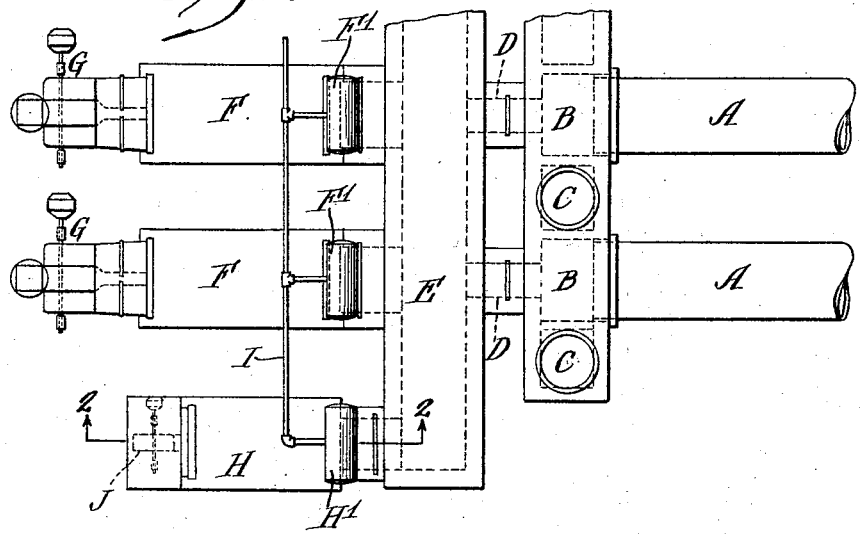

Jan. 11, 1927.

F. FALLA

METHOD AND APPARATUS FOR SUPPLYING ADDITIONAL
HEAT TO WASTE HEAT BOILER PLANTS

Filed May 14, 1925

1,614,109

Inventor
Fernando Falla
by Francis C. [Chandler]
his Attorney

Patented Jan. 11, 1927.

1,614,109

UNITED STATES PATENT OFFICE.

FERNANDO FALLA, OF HOBOKEN, NEW JERSEY, ASSIGNOR TO EDGE MOOR IRON COMPANY, OF EDGE MOOR, DELAWARE, A CORPORATION OF DELAWARE.

METHOD AND APPARATUS FOR SUPPLYING ADDITIONAL HEAT TO WASTE-HEAT BOILER PLANTS.

Application filed May 14, 1925. Serial No. 30,200.

My invention relates to waste heat boiler plants comprising a plurality of industrial furnaces, a common flue to receive the gases from said furnace and one or more waste heat boilers receiving the gases from said flue. In the operation of such plants it occurs from time to time, as for instance when a furnace is shut down, that the heat and volume of the waste heat gases is not sufficient to produce in the waste heat boilers the desired amount of steam and heretofore such a contingency has been provided for sometimes by providing such plants with supplementary fuel heated boilers, and sometimes by providing fuel fed furnaces the gases of which are mixed with the waste heat gases in the common flue and sometimes by introducing fuel into the common flue to be ignited therein and thus raise the temperature of the gases therein.

The plans for providing additional heat to the gases in the common flue are open to the objection that this increases the temperature of the gases in the flues and boilers to an objectionable degree, particularly when the industrial furnaces are cement kilns and there is a liability to clinker the dust deposited in the flues and the employment of a supplemental fuel heated boiler as heretofore used or proposed to be used is uneconomical.

The object of my invention is to provide a method and apparatus for making up deficiencies in the steam producing capacity of such plants by the combustion of fuel which will be highly economical and free from liability to materially raise the temperature of the waste heat gases in the flues, and a further object is to provide a convenient and economical method of supplementing the boiler capacity of such a plant where, for instance, one of a battery of waste heat boilers is shut down.

Generally speaking, my invention consists in the method of supplying additional heated gases to the common flue and boilers of such a waste heat boiler plant by burning fuel in a supplemental boiler furnace, precooling the furnace gases to a temperature approximately within the range of temperatures of the gases delivered by the industrial furnaces, utilizing the extracted heat to form steam in the supplementary boiler and introducing the pre-cooled gases into the common flue of the plant to pass with the waste heat gases to the waste heat boilers. By preference, I regulate the combustion of fuel and the quantity of gas produced in the supplemental furnace in accordance with the pressure of steam in the main supplied by the boilers of the plant.

Another feature of my invention consists in the organization of a plant suitable for the practice of my new method.

Figure 2:
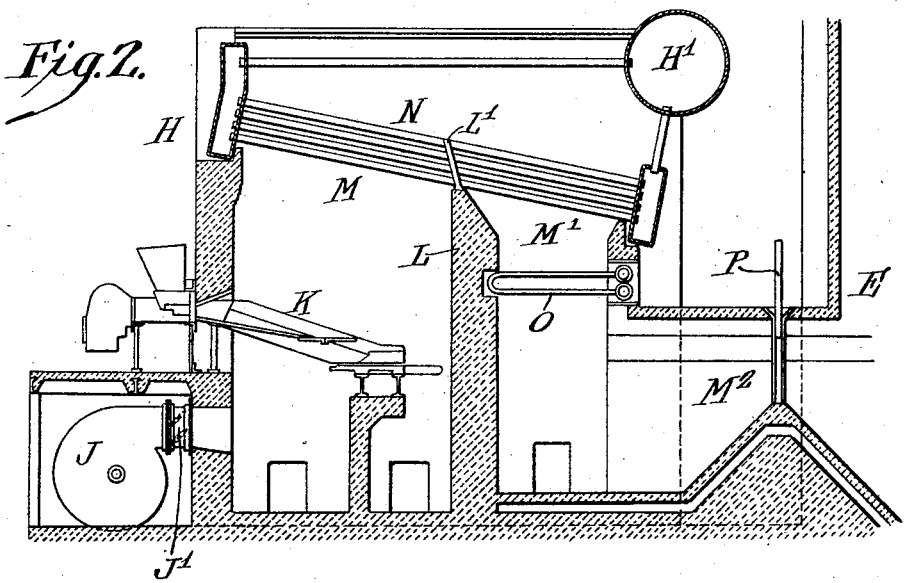

In the drawings which show a plant suitable for the practice of my invention,

Figure 1 is a rather diagrammatic plan view of a portion of a waste heat utilizing plant involving my invention, and Figure 2 is a sectional elevation of the supplemental boiler furnace and boiler taken as on line 2—2 of Fig. 1.

A, A, indicate rotary cement kilns delivering their waste gases into chambers B, B, from which, as is usual, stacks C, C, lead for use when it is not desired to use the waste gases and from which also lead flues D, D, connecting to a common waste heat flue, indicated at E. To flue E are connected waste heat boilers F, F; F′ indicating the steam drums. G, G, are fans used to draw the waste heat gases through the boiler and I is the common steam main. In all the features mentioned above the illustrated plant is of well known construction.

H indicates my supplemental boiler furnace and boiler. H′, the steam drum of this boiler which is connected to the common steam main I. J is a forced draft fan delivering air through a flue provided with adjustable dampers J′ beneath the stoker indicated at K. L is the bridge wall of the supplementary furnace which with a supporting baffle L′ forms a two pass passage through the boiler N. The passes being indicated at M, M′, and connecting through a flue M² provided with a damper gate indicated at P, to the common waste heat flue E. O indicates a superheater for the steam formed in the supplementary boiler.

The supplementary furnace and boiler are fed with fuel and are so constructed that the boiler will only subtract and utilize in making steam such heat units are will reduce the temperature of the furnace gases to a temperature lying approximately within the ordinary range of temperatures of the waste heat gases delivered by the industrial furnaces to the flue E. The essential feature being that the precooled gases from the supplemental furnace on their entry into the common flue will not tend to raise the temperature of the mixed gases substantially above the normal range of temperatures existing in the waste heat gases as normally supplied to the flue, E, and to the waste heat boilers.

In operation and when the industrial furnaces are supplying sufficient waste heat gases to maintain a sufficient supply of steam from the waste heat boilers, the supplementary boiler furnace may be disused or its draft so reduced by means of dampers J' and P that it will consume only a minimum of fuel. In case more heat is required to maintain the steam supply, as for instance when one of the industrial furnaces is shut down, a more energetic combustion of fuel in the supplementary furnace is induced and the furnace gases are pre-cooled by passing through the boiler to the desired temperature, fitting them for use in admixture with the waste heat gases and then introduced into the flue E to mix with the waste heat gases and provide the necessary additional heat units to enable the waste heat boilers to produce the required quantity of steam.

As the heat abstracted in pre-cooling the gases of the supplementary furnace is all utilized in making steam which is introduced into the steam main, it is obvious that to maintain a constant steam supply the quantity of pre-cooled gas introduced into the common flue need not be equal in quantity to the waste heat gas ordinarily produced in the shut down furnace. In fact, assuming that the heat units in the supplementary furnace gases are equal to those of the waste heat gases from one furnace, as about half of these heat units will be abstracted and utilized in making steam during the pre-cooling of the gases, the pre-cooled gas need have only half as many heat units as the waste heat gas from a shut down furnace to maintain a constant steam supply.

In case one of a battery of waste heat boilers is shut down the use of my supplemental furnace to reinforce the remaining waste heat boilers will enable a constant steam supply to be maintained under economical conditions.

As already indicated I propose to regulate the combustion of fuel in my supplemental boiler furnace in accordance with the steam pressure maintained in the common steam main and this may be provided for in any familiar way. For example as described and shown in the patent to Reck, 627,143 of June 20, 1899, or the patent to Coxe, 510,584 of December 12, 1893.

Having now described my invention, what I claim as new and desire to secure by Letters Patent, is:

1. In the operation of a waste heat utilizing plant comprising industrial furnaces, a waste heat flue receiving gases from the furnaces, and waste heat boilers receiving the gases from said flue, the method of economically supplying additional heated gases to said boilers which consists in burning fuel in a supplemental boiler furnace, pre-cooling the gases of said furnace to a temperature approximately within the range of the temperatures of the waste heat gases produced by the industrial furnaces and utilizing the extracted heat to produce steam and introducing the pre-cooled gases into the waste heat flue to mix with the waste heat gases and pass with them to the waste heat boilers.

2. The method of claim 1, together with the further step consisting in regulating the combustion of fuel in the supplemental boiler furnace in accordance with the pressure of steam in the steam main receiving steam from the boilers.

3. The combination with a waste heat utilizing plant comprising a plurality of industrial furnaces, a waste heat flue receiving gases from said furnaces and one or more waste heat boilers receiving gases from said flue, a supplemental fuel burning boiler furnace, a boiler arranged to be heated by said furnace and adapted to pre-cool the gases thereof to a temperature approximately within the range of temperatures of the waste heat gases delivered by the industrial furnaces and a flue leading from the supplementary boiler to the common waste heat flue.

FERNANDO FALLA.